United States Patent [19]
Lupi

[11] Patent Number: 6,142,139
[45] Date of Patent: *Nov. 7, 2000

[54] SYSTEM OF MODULAR ELEMENTS FOR MACHINING MARBLE, STONE AND THE LIKE

[76] Inventor: Quintilio Lupi, 7, Kings Rd., NW10 2EL London, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 09/064,852

[22] Filed: Apr. 23, 1998

[30] Foreign Application Priority Data

Mar. 6, 1998 [IT] Italy .......................... RM 98A000136

[51] Int. Cl.$^7$ ...................................................... B28D 1/04
[52] U.S. Cl. ................................................ 125/15; 125/12
[58] Field of Search .................................. 125/13.01, 15, 125/12, 18, 22

[56] References Cited

U.S. PATENT DOCUMENTS

| | | | |
|---|---|---|---|
| Re. 18,964 | 10/1933 | Roark | 125/13.01 |
| 1,570,318 | 1/1926 | Pollard | 125/13.01 |
| 2,475,892 | 7/1949 | Hasty et al. | |
| 2,807,256 | 9/1957 | Woolley | 125/13.01 |
| 3,282,263 | 11/1966 | Christensen et al. | 125/15 |
| 4,962,748 | 10/1990 | Schweickhardt | 125/13.01 |
| 5,197,453 | 3/1993 | Messina | 125/15 |
| 5,373,834 | 12/1994 | Chiuminatta et al. | 125/15 |
| 5,465,706 | 11/1995 | Sawluk | 125/15 |

FOREIGN PATENT DOCUMENTS

| | | |
|---|---|---|
| 669 045 | 3/1966 | Belgium . |
| 0 329 915 | 8/1989 | European Pat. Off. . |
| 0 898 051 | 2/1999 | European Pat. Off. . |
| 29 40 196 | 4/1981 | Germany . |
| 30 38 887 | 5/1982 | Germany . |
| 38 07 136 | 9/1989 | Germany . |
| 79 806 | 1/1980 | Luxembourg . |
| 651 902 | 3/1979 | U.S.S.R. . |
| 1 196 279 | 12/1985 | U.S.S.R. . |
| WO 97 37774 | 10/1997 | WIPO . |

OTHER PUBLICATIONS

Patent Abstract of Japan; JP 57 048413; Mar. 1982; vol. 006, No. 120; Jul. 1982.
Patent Abstract of Japan; JP 03 135812; Jun. 1991; vol. 015, No. 350; Sep. 1991.

*Primary Examiner*—David A. Scherbel
*Assistant Examiner*—Anthony Ojini
*Attorney, Agent, or Firm*—Nixon & Vanderhye PC

[57] ABSTRACT

The system of modular elements comprises a plurality of disc elements (11, 12 . . . ) with diamond outer rings (11a, 12a . . . ) for assembling on a single drive spindle with a spacing approximately equal to their thickness; mechanical fragmenting means (19, 20, 21, 22 . . . ) being provided in the spaces between the disc elements to operate essentially by impact, in contrast to the abrasive action of the diamond outer ring of the said disc elements; which disc elements have different diameters forming a broken line that corresponds substantially to the outline of the profile or shaping to be produced on marble, stone or the like; the arrangement being such that the disc elements (11, 12 . . . ) cut grooves by diamond abrasion and the mechanical fragmenting means (19, 20, 21, 22 . . . ) shatter the parts projecting from the grooves with an action of fragmentation by impact and by brittle fracture.

25 Claims, 16 Drawing Sheets

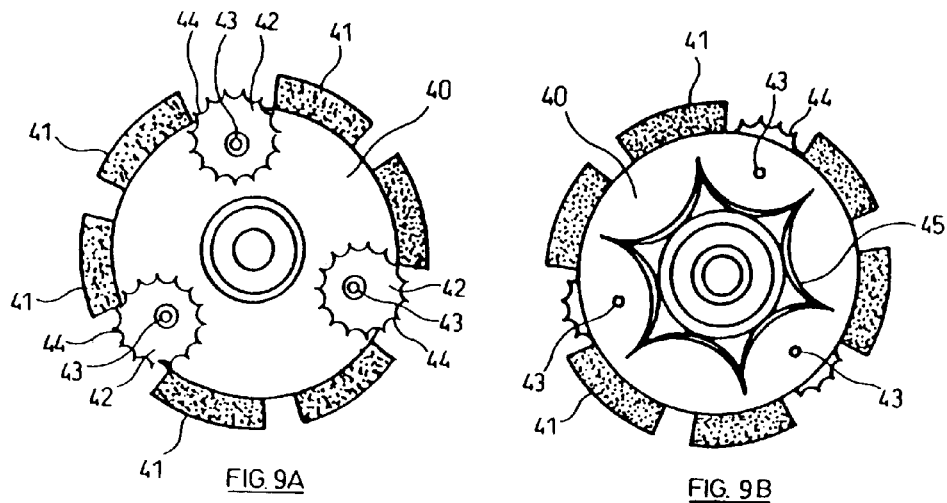
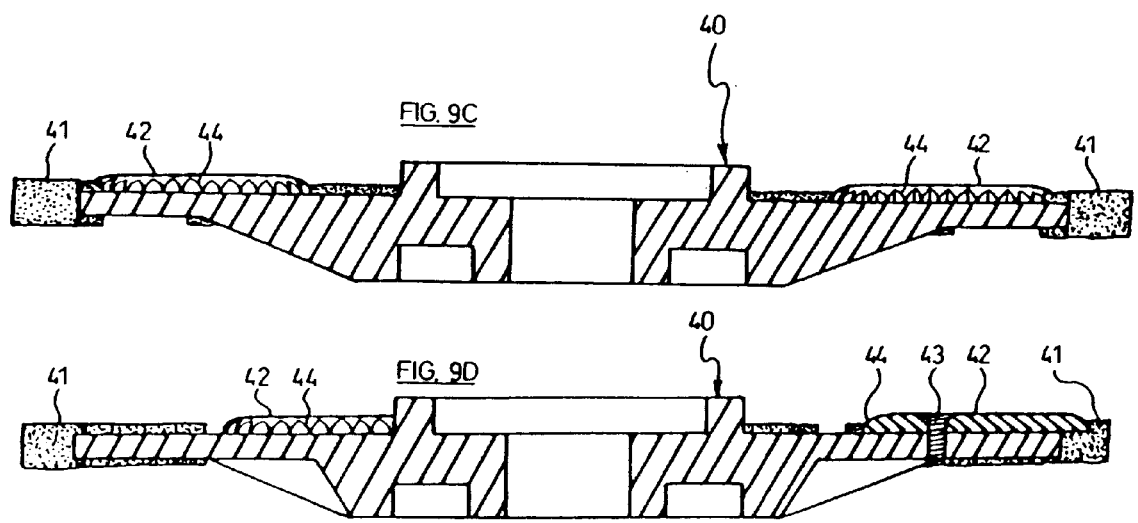

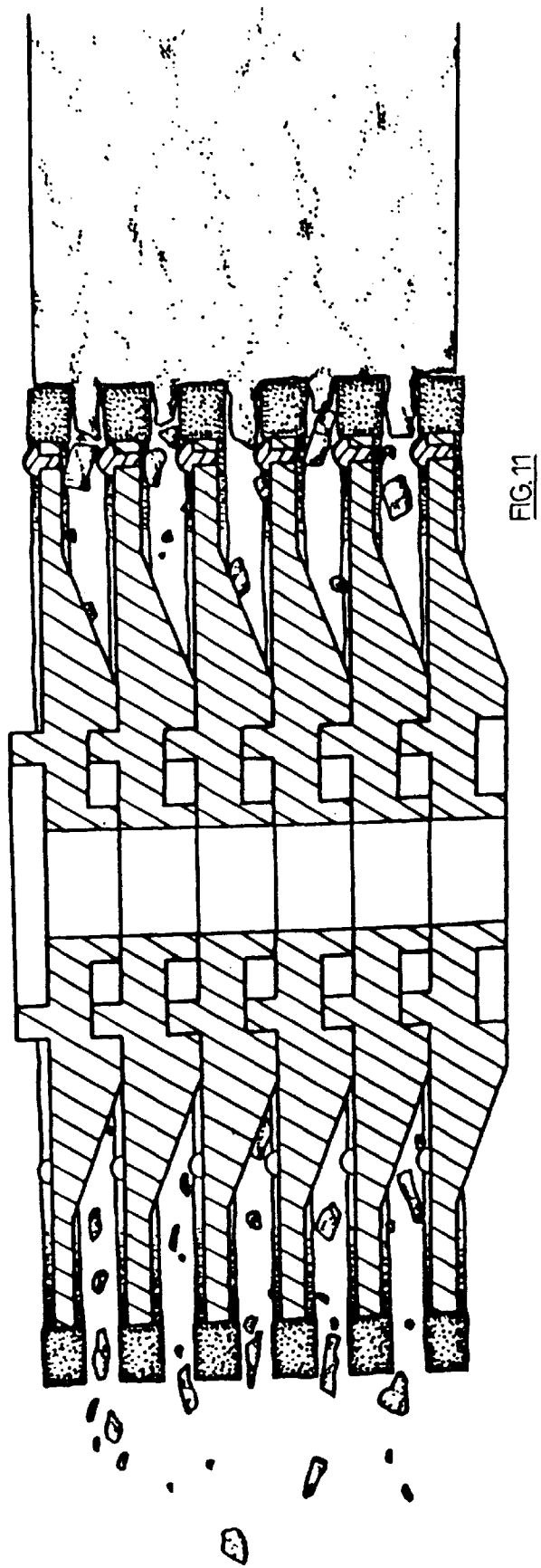

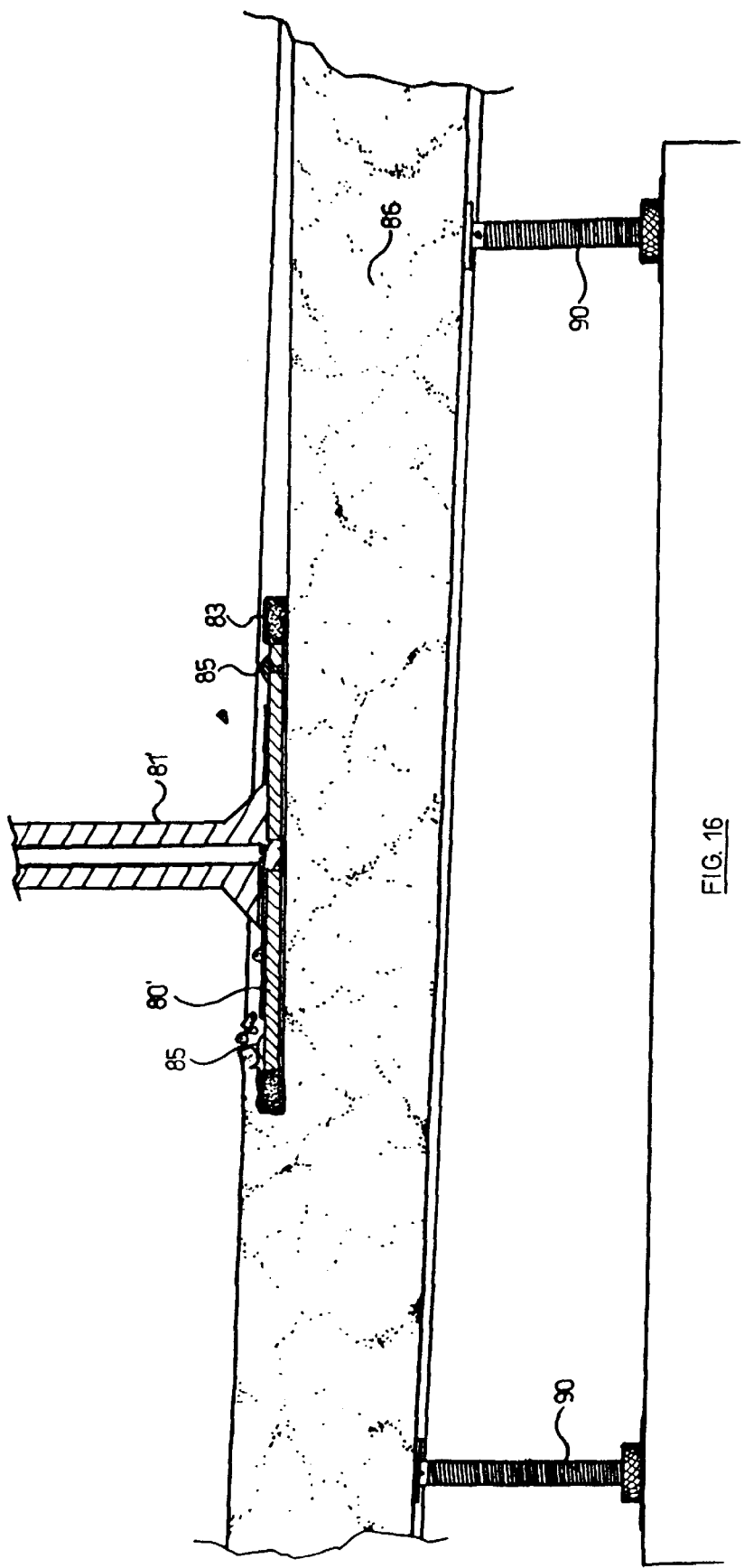

SYSTEM OF MODULAR ELEMENTS FOR MACHINING MARBLE, STONE AND THE LIKE

The present invention relates to a system of modular elements for machining marble, stone and the like.

The machining of marble, stone and the like which requires the removal of a large quantity of material presents numerous difficulties even when using diamond tools.

The removal of large amounts of material either for excavating cavities or for at least the rough finishing of deep shapings on slabs is done by chiselling, drilling and fragmenting the excess material, or by successive passes of diamond tools.

All these known techniques have many drawbacks: in the case of chiselling or core drilling and fragmenting the excess material, the operations require a considerable amount of time and labour. When using diamond tools the operations are slow and costly owing to the wear of the said diamond tools.

Moreover, in the case of deep shapings, when profiled diamond tools are used that part of the tool which removes a large quantity of material will obviously suffer greater wear than that part or parts which remove less material. The life of the profiled diamond tool is therefore limited to the life of the diamond part performing most of the removal work, while the part which has done "little" work or no work at all suffers limited or zero wear. When one part of the diamond material of such a tool is worn the entire profiled tool must be replaced, with a consequent waste of non-worn diamond since these tools cannot be reconstructed or made new again as can be done, for example, with a bonded grinding wheel, which can be revived or reprofiled owing to the fact that the diamond part is a thin layer of diamonds only on the surface of the profiled tool. Once some of the coating is worn, the tool must be scrapped even if part of the diamond coating is still useable. This obviously increases costs.

Clearly, with profiled diamond tools the marble or stone or the like is all removed by abrasion: the amount of diamond necessary per unit of surface area of the tool is therefore large.

Furthermore, each type of shaping or profile necessitates a "negative" shaped tool with corresponding diamond coating for each design of shaping or profile, making it necessary to immobilize capital in keeping a large assortment of tools.

The chief object of the present invention is to provide a system of the abovementioned type that combines the advantages of diamond machining and fragmentation machining, bringing together the advantages of the individual techniques.

Another object of the present invention is to provide a system of the abovementioned type in which a plurality of elementary tools can be assembled together to form any desired profile and that will be particularly efficient at quickly and inexpensively performing profiling work of the abovementioned kind while reducing the inventory of tools and so cutting costs and increasing machining speeds.

The present invention provides a system of modular elements for the abovementioned objects comprising a plurality of disc elements with diamond outer rings for assembling on a single supporting drive spindle with a spacing approximately equal to their depth; mechanical fragmenting means being provided in the spaces between the disc elements to operate essentially by impact, in contrast to the abrasive action of the diamond outer ring of the said disc elements; which disc elements have different diameters forming a broken line that corresponds substantially to the outline of the profile or shaping to be produced on marble, stone or the like; the arrangement being such that the disc elements cut grooves by diamond abrasion and the mechanical fragmenting means shatter the parts projecting from the grooves with an action of fragmentation by impact or by brittle fracture.

Other features, objects and advantages of the system according to the present invention will become clear in the following description of certain preferred embodiments thereof which are reported by way of non-restrictive example, and with the support of the figures of the accompanying drawings, in which:

FIGS. 9A, 9B, 9C and 9D show various views of a modified construction of one of the disc elements of the machining system according to the invention;

Figure 15A:
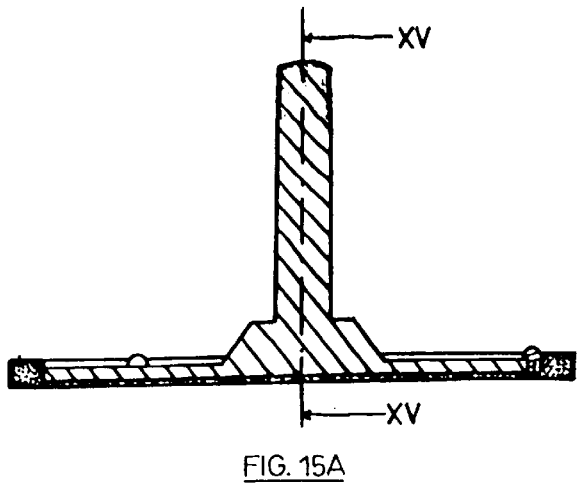
Figure 15B:
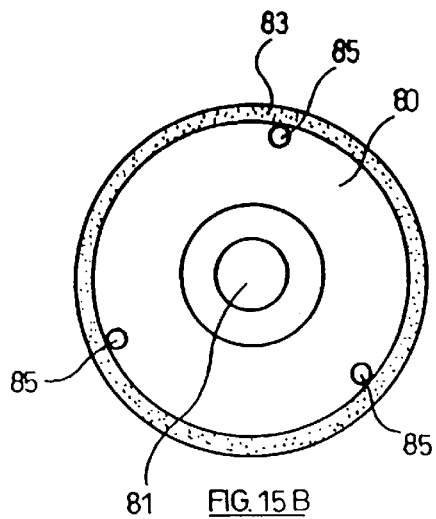
Figure 15C:
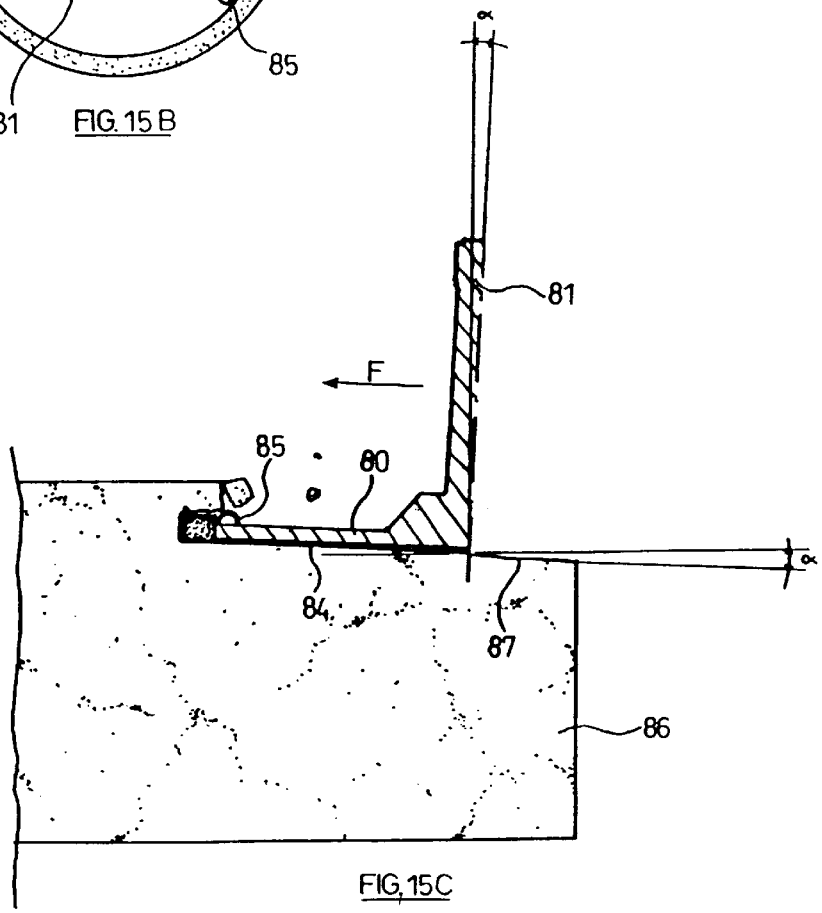

FIG. 11 schematically shows a machining operation with the system of FIGS. 10A, 10B, 10C, 10D and 10E;

FIGS. 12A, 12B, 12C and 12D show various views of another embodiment of one of the disc elements of the machining system according to the invention;

FIGS. 13A, 13B, 13C and 13D show yet another variant of one of the disc elements of the machining system according to the invention;

FIGS. 14A, 14B, 14C and 14D show another embodiment of one of the disc elements of the machining system according to the invention;

FIGS. 15A, 15B, and 15C show yet another variant of the machining system according to the invention; and FIG. 16 shows another variant of the machining system of FIGS. 15A to 15C.

Figure 1:
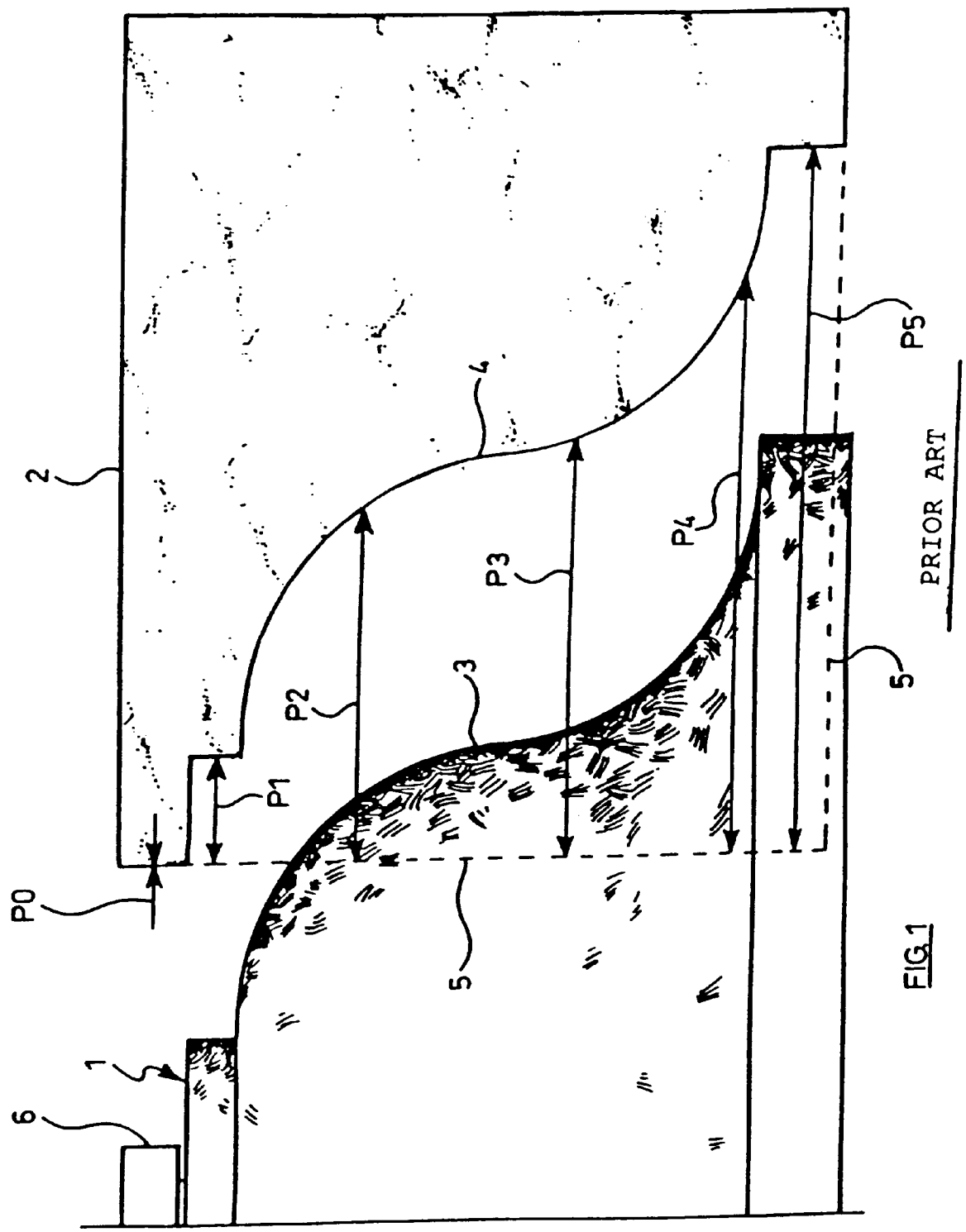
FIG. 1 is an example showing the machining of a shaping on a slab of marble or stone according to the prior art.

With reference to the drawings and in particular to FIG. 1, the conventional method of forming shapings with a diamond wheel 1 involves running it a number of times past a block of marble or stone or the like 2 so as to reproduce the profile or outline 3 of the wheel 1 as a profile or outline 4 in the marble block 2 by abrasion.

Assuming that the marble block 2 initially has a rectilinear profile indicated in broken lines at 5, the diamond-surfaced outline 3 of the wheel 1 will have to machine away the quantities P1, P2, P3, P4 and P5 to reach the desired depth, usually defined relative to the broken line P0 and limited by the contact of a guard 6 mounted on the diamond wheel 1.

It is immediately obvious that the diamonds of the wheel 1 will have to do much more work at depth P5 than the diamonds at depths P4, P3, P2 and P1.

This method of working in accordance with the prior art produces good results but proves to be extremely wasteful: the diamonds of the wheel 1 must perform an enormous amount of work of removal at P3, P4 and even more so at P5, so that when the diamond coating of zone P5 is totally worn away by the heavy removal work effected in this zone, the coating of zones P1 and P2 will still be practically new. If the diamond coating is completely worn away at P5, then in practical terms the diamond wheel 1 must be scrapped as it is impossible to reconstruct the diamond coating in the worn area. There is consequently an enormous waste of money, which needs no further comment.

In effect, then, in the prior art a diamond wheel which is excellent for the work of semifinishing and/or finishing is used for the work of coarse material removal for which it is economically unsuitable.

In addition, for roughing work it is necessary to have access to as many grinding wheels as there are possible profiles, which means increased inventory costs.

Figure 2:
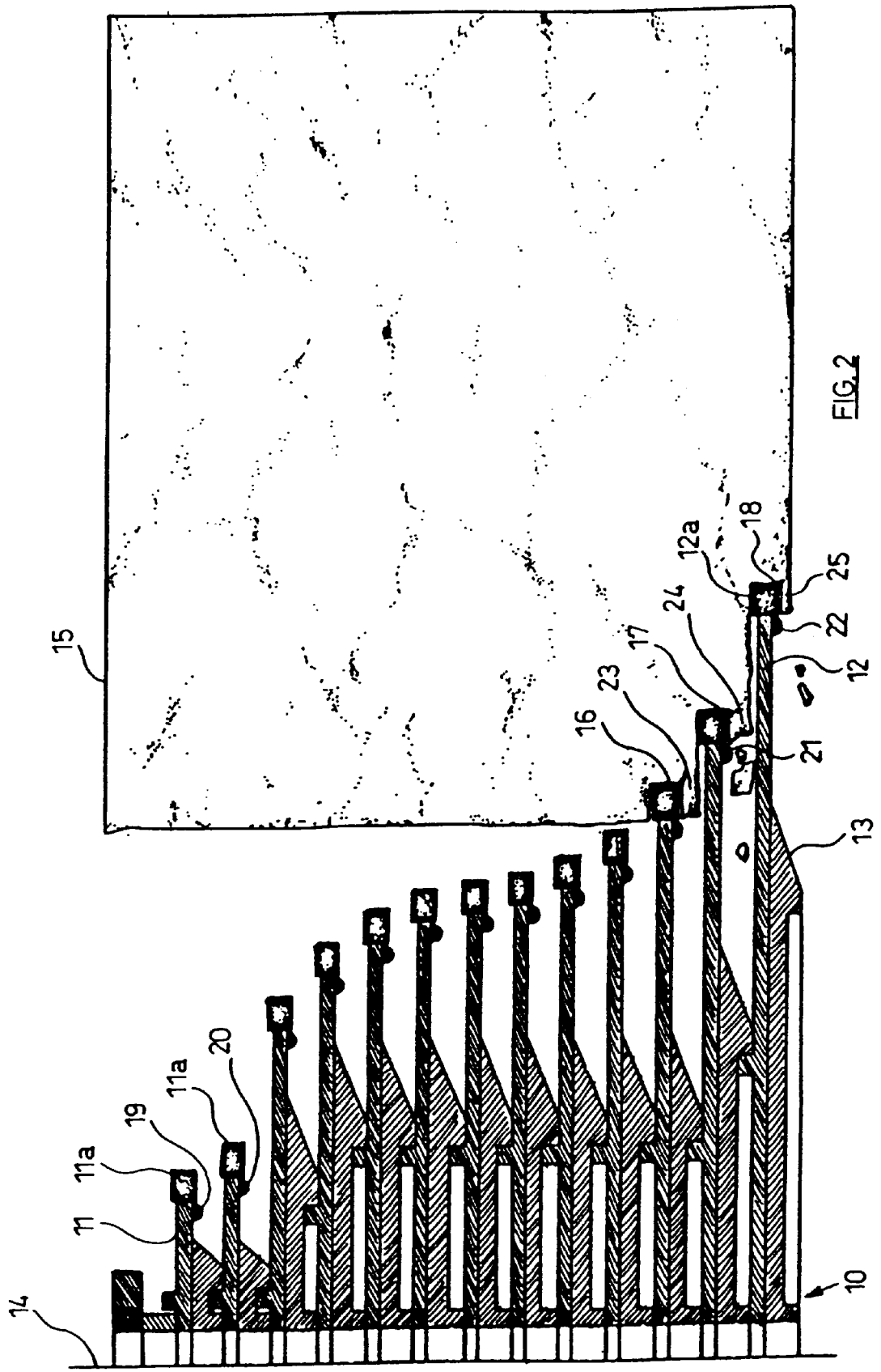
FIG. 2 shows an example of a system according to the present invention starting the rough machining of a shaping on marble or stone intended to produce the same outline as the example shown in FIG. 1.

With reference to FIGS. 2 ff., a description will now be given of the tool system according to the invention for the rough profile machining of a block of marble, stone or the like.

In FIGS. 2 to 5 the present invention provides a stack, marked 10 as a whole, of disc elements or tools 11, 12 . . . whose form provides spacer parts 13 designed to abut against suitable corresponding projections so that the disc elements 11, 12 . . . can be stacked together with a predetermined spacing between their respective external peripheries.

FIG. 2 shows the cross-section of only half of the discs, the other half being generally symmetrical.

The discs 11, 12 . . . which form the stack 10 are clamped on a drive spindle 9 having axis 14 and rotated by a motor.

Each disc 11, 12 . . . is provided with a diamond ring 11a, 12a . . . The geometrical form of the discs, as can be seen in FIG. 2, is designed in such a way that the diamond rings 11a, 12a . . . are approximately equidistant from each other and in such a way that the centre of gravity of each diamond ring (seen in section) corresponds to a broken line that approximates the profile 3 of the diamond grinding wheel 1 of the prior art, as shown in FIG. 1, and, consequently, to the geometrical shape of the shaping to be produced in the marble or stone.

As the stack 10 and block of marble or the like 15 approach each other, the diamond rings 11a, 12a . . . will produce channels 16, 17, 18 . . . by abrasion in the face of the block 15 nearest the tool by means of abrasion with the diamonds with which the diamond ring is made.

The individual disc elements 11, 12 . . . contain projections 19, 20, 21, 22 . . . consisting of, for example, bosses of hard tough metal which, by impact, exert a fragmenting action on the projections 23, 24, 25 . . . which form between the channels cut into the marble block. It should be understood that in the following text reference will be made generically to marble to indicate any structural or building material susceptible to brittle fracture, including concrete and similar conglomerates, as will be clear to those skilled in the art.

The projections 19, 20, 21, 22 . . . exert a "hammering" action causing brittle fracture of the projections 23, 24, 25 . . . and the fragments will be expelled by the centrifugal force produced by the rotation of the stack 10 together with the slurry generated by the abrasion with the diamonds. This is also facilitated by the action of the water-based lubricant/coolant, as is well known in the field of wet machining with abrasive tools.

Figure 3:
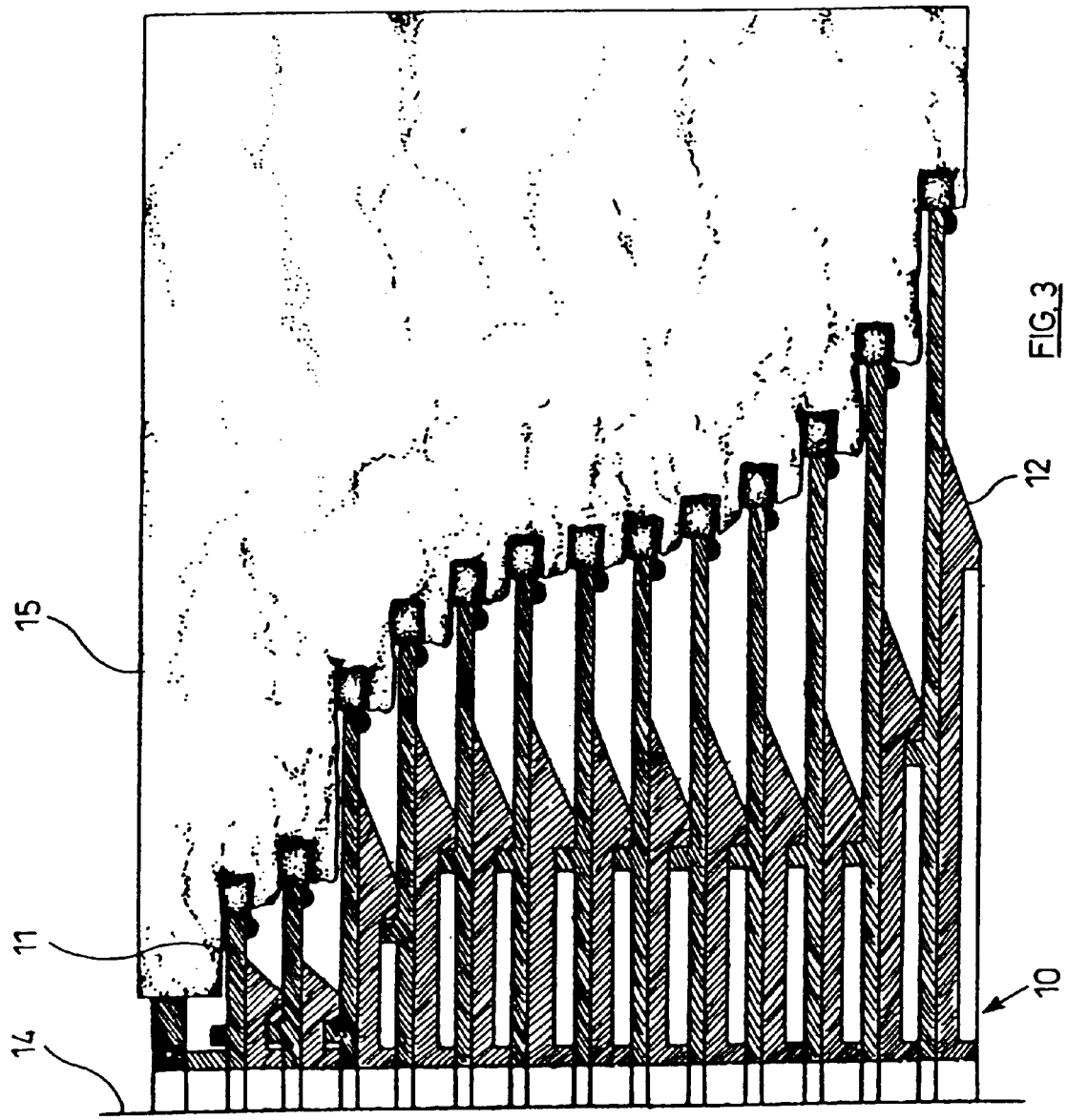
FIG. 3 shows a view corresponding to that of FIG. 1 as it reaches the end of the rough machining.
Figure 4:
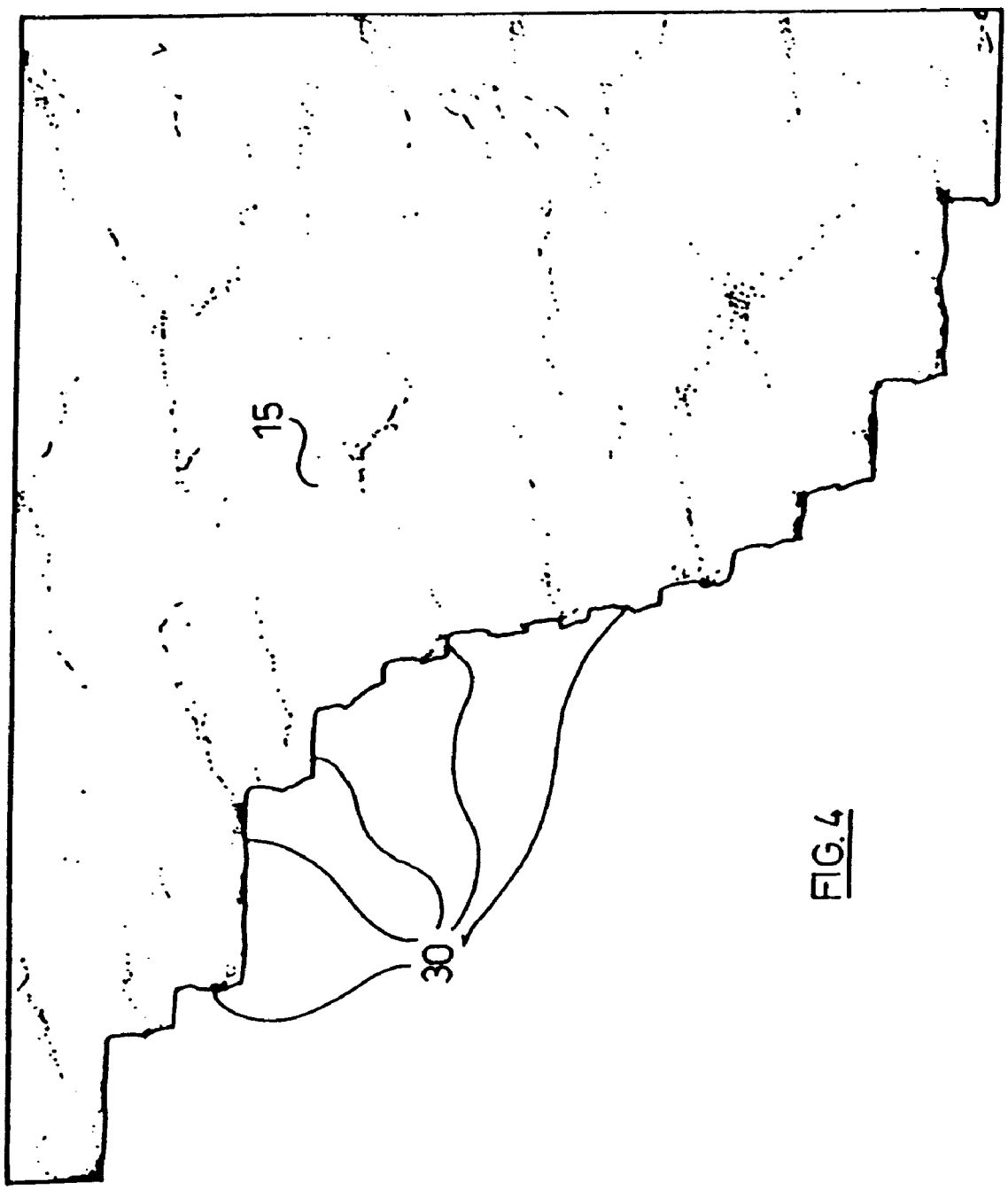
FIG. 4 shows the appearance of a workpiece after completion of the operations shown in FIGS. 2 and 3.

FIG. 3 shows the progress of the action of abrasion and fragmentation by brittle fracture of the marble leading to the approximate profile defined by the broken line formed by the diamond rings illustrated in detail in FIG. 2.

It should be noticed that with the arrangement shown in FIGS. 2 and 3, the work of removing marble by abrasion is very small compared with what was described earlier with reference to FIG. 1, since roughly at least half the work of removal of excess marble is done by brittle shattering of the material and not by abrading it with the diamonds.

It is also important to notice that if the disc element 12, which has performed much more work of penetrating the marble than the disc element 11 suffers excessive wear of its diamond coating, in contrast to the small degree of wear of the diamond coating of the disc element 11, can easily be replaced so that the stack 10 is immediately restored to full efficiency, the serious drawback of scrapping the entire diamond wheel as explained previously with reference to FIG. 1 not arising. Again, if judged appropriate, the grain of the diamonds in the diamond rings of the various disc elements could be of different dimensions, with coarser particles for those disc elements that have to do more abrasive removal work. This differentiation of the grain of the diamonds would in practical terms be impossible with monolithic diamond wheels such as those of the conventional technique illustrated in FIG. 1.

Figure 5:
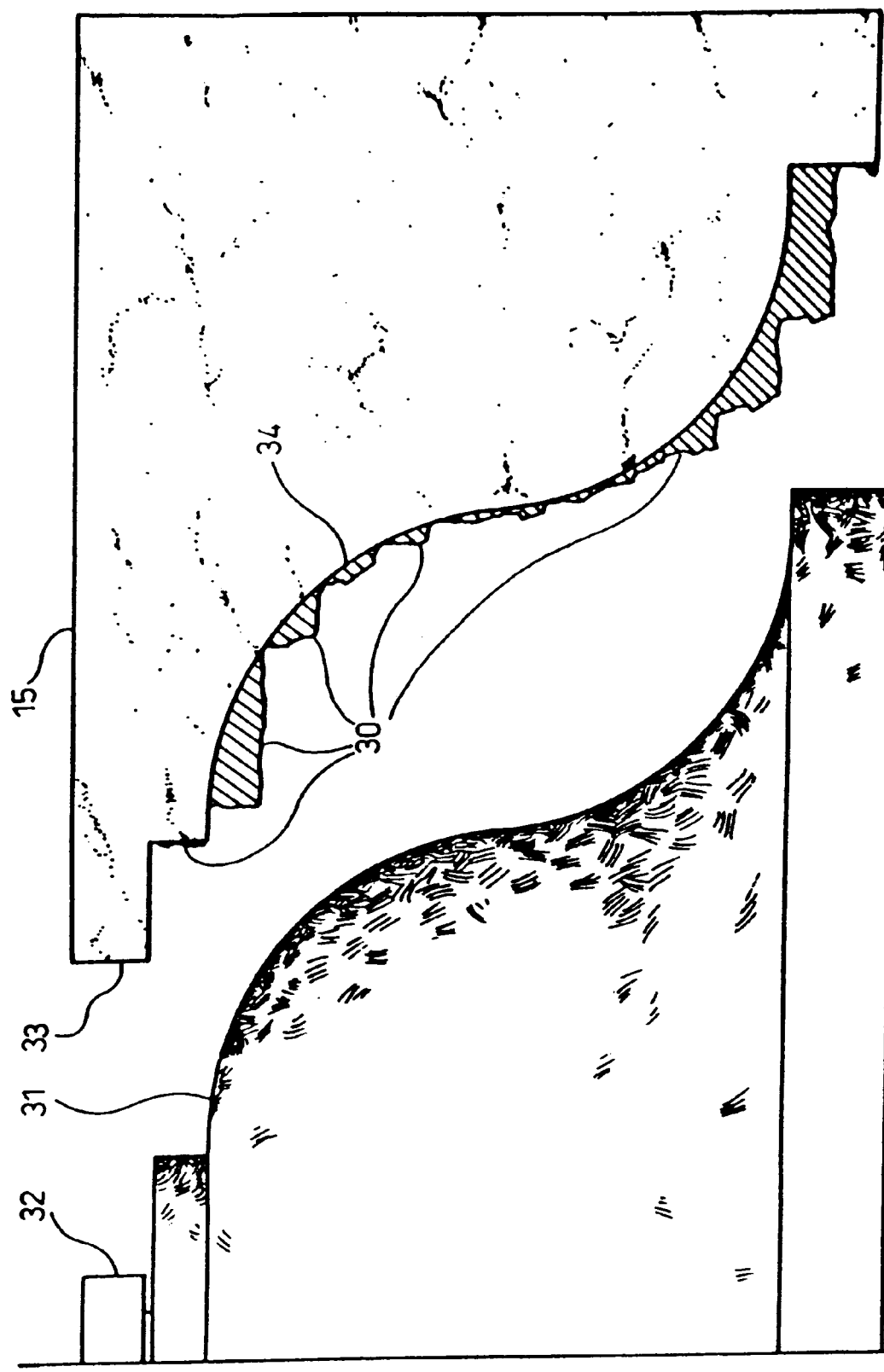
FIG. 5 shows in diagrammatic form the diamond finishing of the roughed piece shown in FIG. 4.

Clearly, by using an appropriate assortment of disc elements it is possible to create, in broken form, all the desired profiles corresponding to the finishing wheel as shown in FIG. 5.

As will be noted in FIG. 5, after being machined as shown in FIG. 3, the marble block 15 will have a rough-finished profile corresponding to the hatched parts 30. A finishing wheel 31 can now be brought into action for the conventional prefinishing—or indeed finishing—removal by diamond abrasion.

A guard 32 which will abut with the edge 33 of the marble block 15 will act as the limit stop when the diamond finishing wheel 31 has gone the full distance into the block 15, thus forming the desired profile 34.

Next, if necessary, the usual mirror polishing operations can be performed using rubber-bonded diamond wheels or the like.

The advantages of the construction described thus far will be immediately obvious to a person skilled in the art sensitive to cost management and to the optimization of tool utilization.

Figure 6:
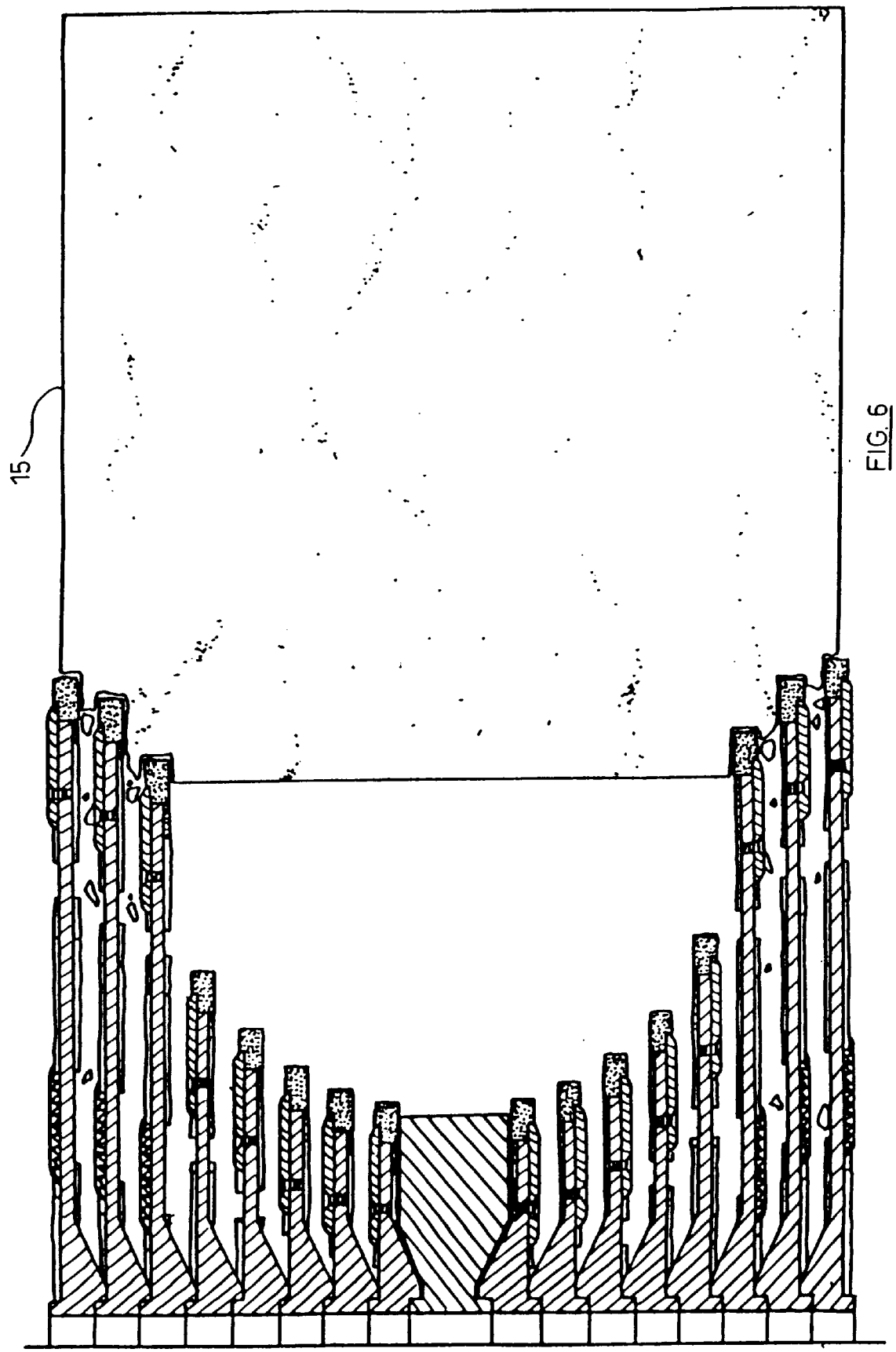
FIG. 6 shows another example at the beginning of machining for creating symmetrical profiles.
Figure 7:
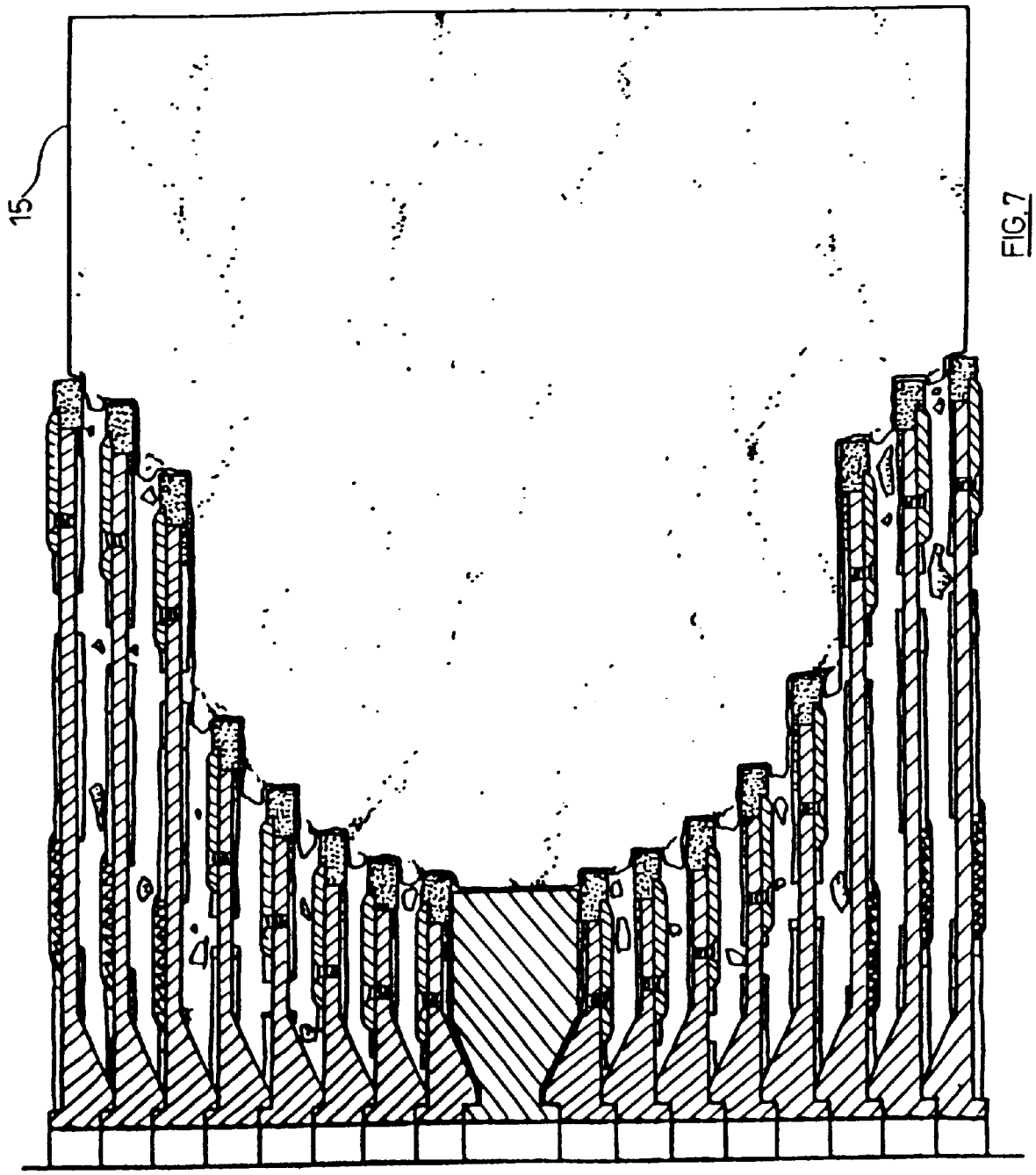
FIG. 7 shows a view corresponding to that of FIG. 6 at the end of the rough machining phase.
Figure 8:
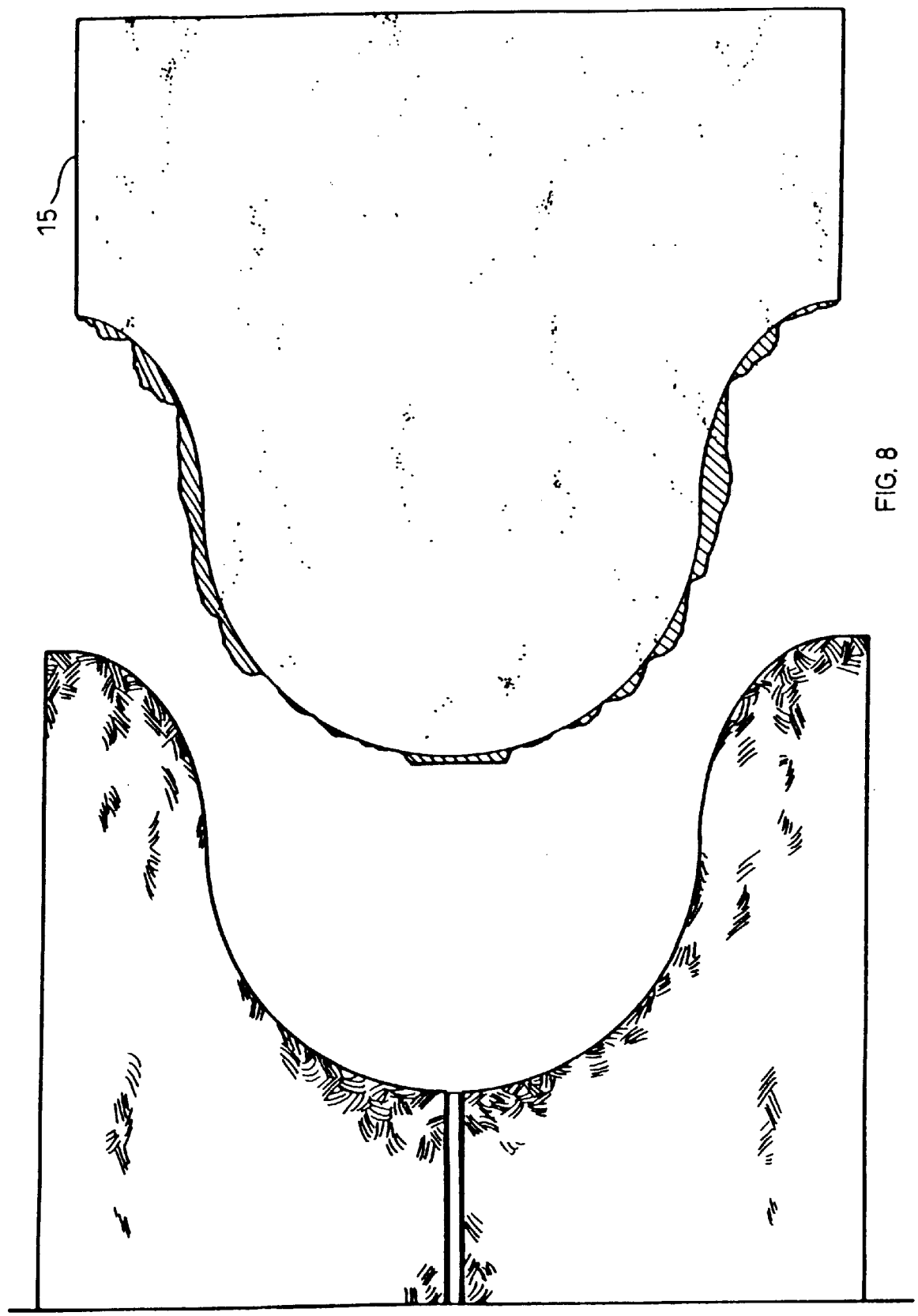
FIG. 8 shows a finishing operation with a diamond wheel.
Figure 10A:
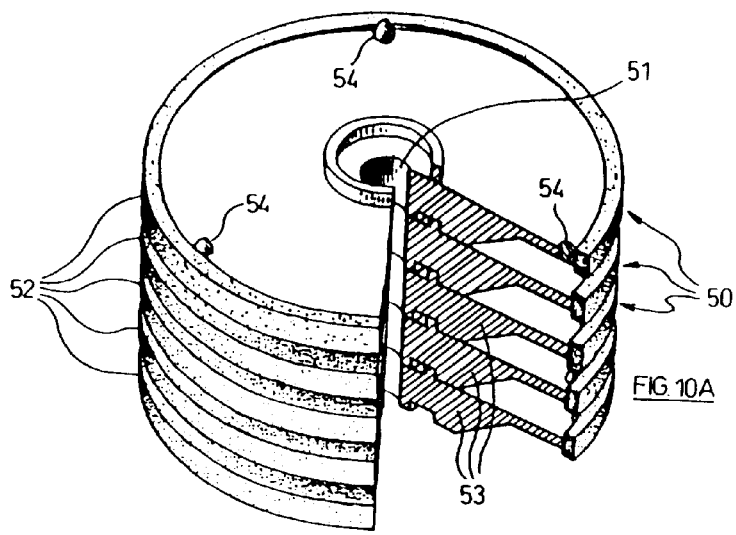
FIGS. 10A, 10B, 10C, 10D and 10E show various views of another modified construction of one of the disc elements of the machining system according to the invention.
Figure 10B:
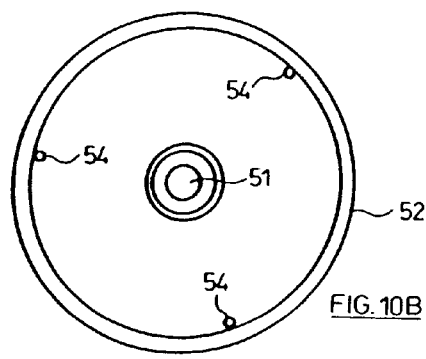
Figure 10C:
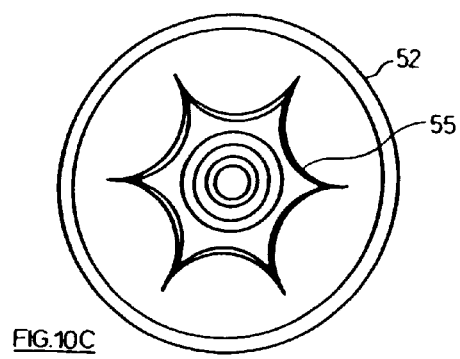
Figure 10D:
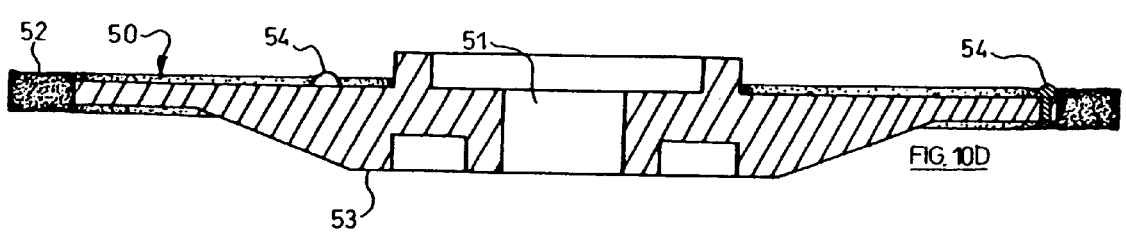
Figure 10E:
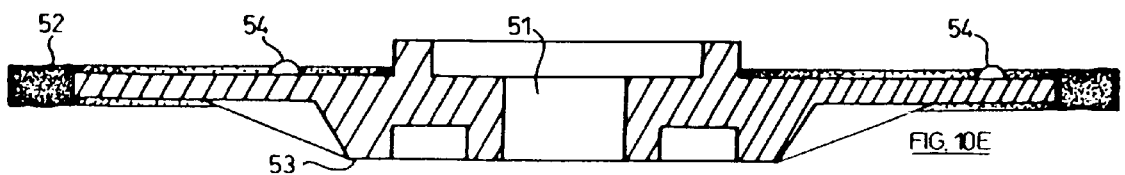
Figure 12A:
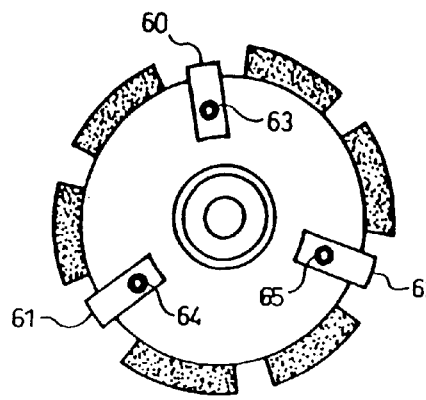
Figure 12B:
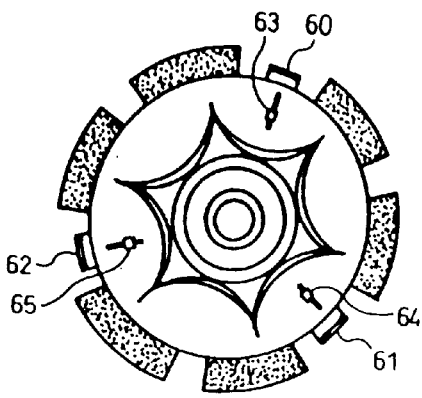
Figure 12C:
Figure 12D:
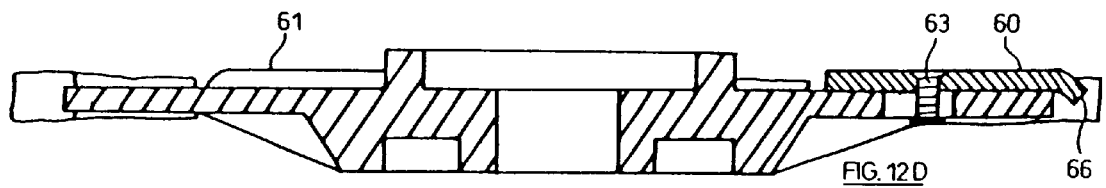

FIGS. 6, 7 and 8 show by way of example the rough machining of a symmetrical profile on a marble block 15 using a different type of disc element. It should be understood that the type of machining shown in FIGS. 6, 7 and 8 could be performed with tools of the type described earlier with reference to FIGS. 2 to 5.

In the construction shown in FIGS. 6 to 8, the disc elements used are those illustrated by way of example in FIGS. 9A, 9B, 9C and 9D.

As can be seen in the latter figures, the disc element 40 possesses a peripheral diamond coating 41, preferably in sectors, and the projections 19, 20, 21, 22 . . . of the disc elements 11, 12 . . . are replaced with rotating planetary elements 42 each pivoting eccentrically at 43.

The planetary elements 42 have wedge-shaped teeth 44 to promote the brittle fracture of the projections which form during the cutting of the channels by the diamond ring against the face of the marble block 15 being machined.

The eccentric rotation of the toothed planetary elements 42 creates a wedge action against the part of the marble to be fragmented by a more progressive action than the version shown in FIGS. 2 to 5. This version may be advantageous in machining certain types of marble. Furthermore, a progressive action such as that provided by the planetary elements shown in FIGS. 6 to 9 reduces machine vibration so that there is less stress on the bearings of the supporting spindle of the tool stack.

FIG. 9B shows a star element 45 on the underside of each disc element 40, its purpose being to encourage the expulsion of the detritus and slurry mixed with water which is produced during machining.

FIGS. 10A to 10E show a further set of another type of disc element according to the invention. This type is particularly suitable for cutting channels in hard materials such as concrete or for excavating large cavities in a marble block, after a pilot hole has first been cut, or indeed for planing the sides of very thick marble slabs.

As shown in FIGS. 10A, 10B, 10C, 10D and 10E, a stack of disc elements 50 is provided with a central hole 51 for mounting on a spindle (not shown). The disc elements 50 have a continuous diamond ring 52. The form of the disc elements 50 includes spacer parts 53 with retention recesses so that the discs 50 can be stacked with predetermined spacing between the diamond rings 52. Projecting elements 52 around the periphery of the discs 50 carry out the fragmentation action explained earlier.

On the opposite side of the disc elements 50 from the projecting elements 54 is a star element 55 similar to the star element 45 of FIG. 9B.

FIG. 11 shows a planing action using the arrangement show in FIGS. 10A to 10E.

A detailed explanation is superfluous as it can easily be deduced from the foregoing description.

FIGS. 12A, 12B, 12C and 12D show another embodiment of the tools according to the invention.

The general structure is identical to that discussed with reference to FIGS. 9A, 9B, 9C and 9D and common parts will not therefore be described in detail.

Unlike the fragmenting elements 42, 43, 44 of FIGS. 9A, 9B, 9C and 9D, adjustable blocks 60, 61, 62 fastened with an antirotation pin at 63, 64, 65 are provided.

The blocks 60, 61, 62 each have a tooth 66 which is partly bent down to perform the fragmenting task described previously.

The provision for radial adjustment makes possible both compensation for wear in the blocks 60, 61, 62 and adjustments to suit the material that is to be machined.

Referring now to FIGS. 13A, 13B, 13C and 13D, another embodiment of the present invention which is particularly suitable for tools of relatively small diameter will now be described.

Referring to the abovementioned figures, the stackable disc element as discussed earlier comprises a disc 70 having a central hole 72 for mounting on a supporting drive spindle (not shown), and has a diamond ring 71.

Mounted idly at 75 on top of the disc 70 (FIGS. 13A, 13C) is an eccentric disc 73 with wedge-shaped teeth 74 around its periphery.

As the disc element 70 rotates, the eccentric disc 73 is caused to rotate with it by the fragmenting action discussed earlier.

Figure 13C:
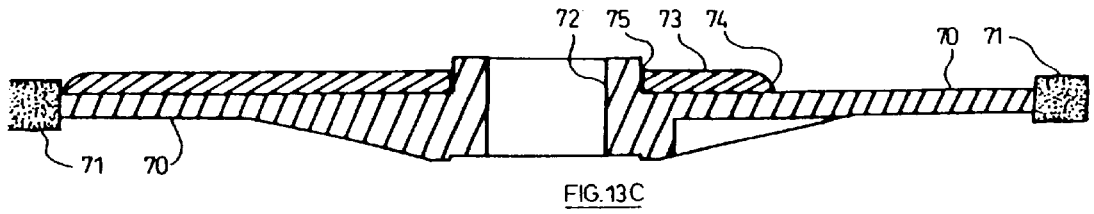
Figure 13A:
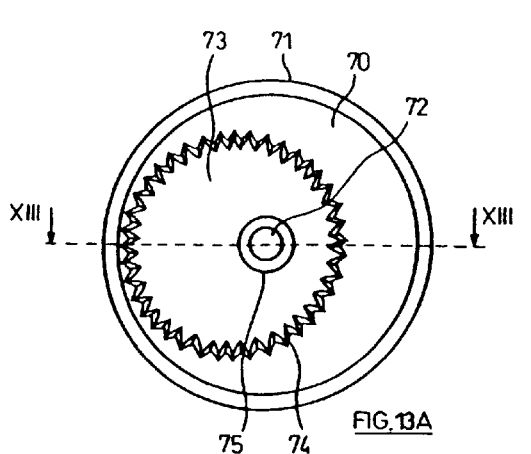
Figure 13B:
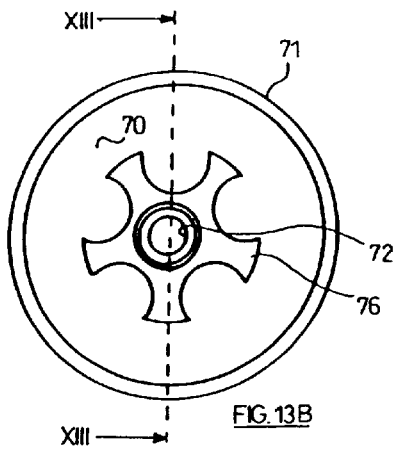

The construction of the tool in cross-section is shown in FIG. 13C which is a combined view of sections on the planes XIII—XIII indicated in both FIGS. 13A and 13B. The star element 76 is for removing machining detritus.

Figure 13D:
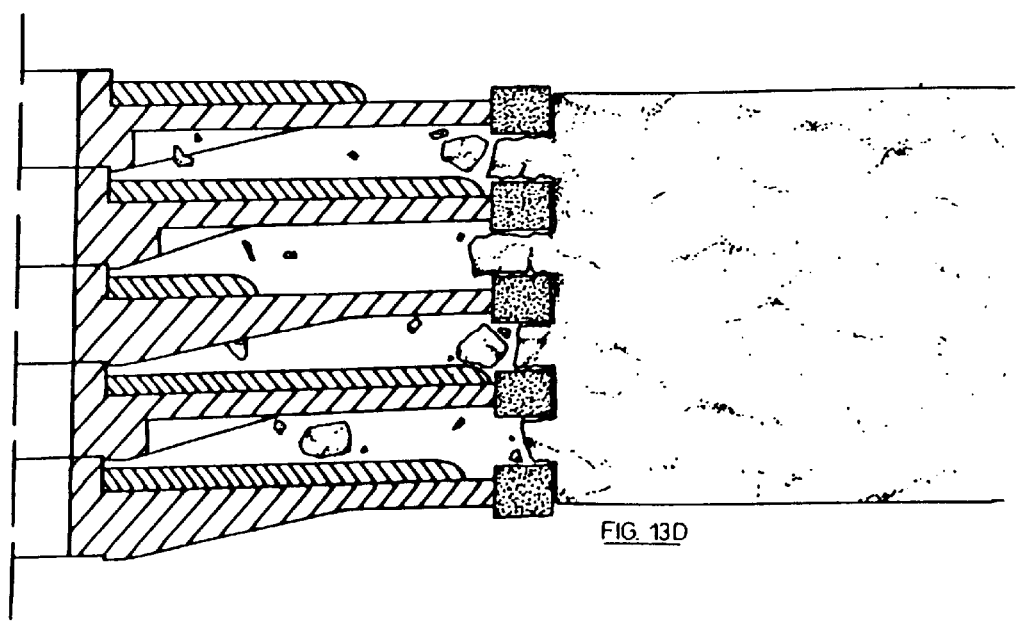
Figure 14C:
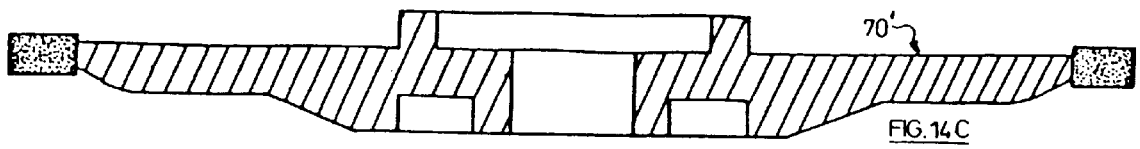
Figure 14B:
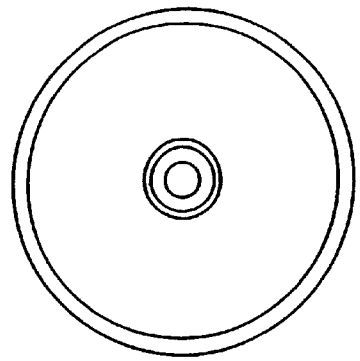
Figure 14A:
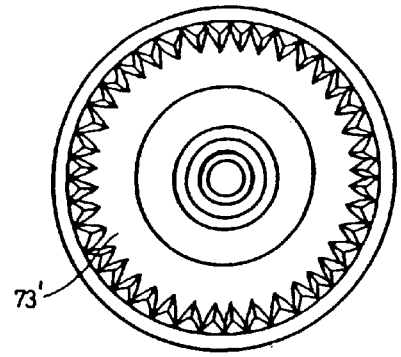
Figure 14D:
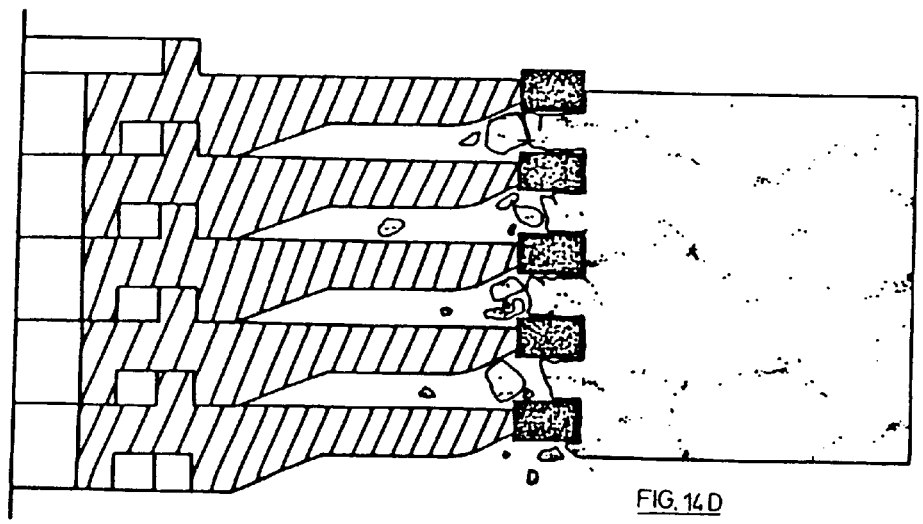

The illustration of FIG. 13D, which by way of nonrestrictive example shows disc elements having the same diameter, depicts the operation of diamond abrasive removal and fragmentation of the material by brittle fracture.

FIGS. 14A, 14B, 14C and 14D show an embodiment which is similar in some ways to that of FIGS. 13A, 13B, 13C and 13D, with the difference that the disc 73', which has wedge-shaped teeth 74' on its periphery, is integral or monolithic with the diamond disc element 70. This construction, which will not be described in further detail, is especially suitable for small-diameter tools and for machining materials that break up with relative ease.

FIGS. 15A, 15B and 15C show a tool based on the technical teaching of the present invention for machining parts.

As can be seen in FIG. 15A, the tool comprises a flat disc 80 mounted rigidly on a supporting drive spindle 81.

The flat disc is given a diamond ring 83 around its circumference and a diamond coating 84 on its underside.

Inside the circumference defined by the diamond coating 83 are projections 85 for breaking up the material into which the diamond ring 83 has first cut.

FIG. 15C shows a section on the plane XV—XV marked in FIG. 15A of the tool where the spindle 81 is positioned at an angle α to the vertical in order to cut an inclined plane at an angle α to the horizontal into a block or slab 86 of material. The tool advances in the direction of arrow F so as to cut an inclined plane 87.

The methods of operation have already been described earlier and no further detailed description is necessary.

A tool of this kind finds particular application in the machining of the sloping draining boards of sinks and the like where these are made entirely or partly of a block of marble, granite or the like.

What is shown in FIGS. 15A, 15B and 15C relative to the machining of a block or slab of material by a tool with its axis inclined relative to the vertical should be regarded as purely for explanatory purposes. In practice it will be more convenient to have the slab or block or marble inclined from the horizontal at the desired angle using straightedges 90 of suitable height and keeping the spindle 81' of the tool vertical, i.e. in the condition in which it is usually found in machines for machining marble, stone and the like, as illustrated in FIG. 16.

Although not illustrated in the various figures, it is quite possible for the drive spindle supporting the machining tools to be hollow with apertures corresponding to the individual tools for the supply of a cooling and lubricating fluid. The fluid could conveniently also contain those materials normally used in drilling hard rock, such as bentonite and other additives, as is well known to those skilled in the art.

It should also be noted that the fragmenting elements in the form of planetary elements or discs with wedge-shaped teeth can be provided with diamond coatings for their teeth.

The present invention has been described with reference to certain currently preferred embodiments thereof, but it will be understood that changes and modifications can in practice be made to it without departing from the scope of protection of the present intellectual property document.

What is claimed is:

1. An apparatus for machining a generally continuous profile in brittle-fracturing material comprising:
   a drive spindle;
   a plurality of disc elements assembled proximate to one another on the drive spindle wherein adjacent disc elements define spaces therebetween, each disc element having a thickness and an outer diameter independent of the thicknesses and the outer diameters, respectively, of adjacent disc elements, at least one of the disc elements having a diameter different from another one of the disc elements, the outer diameters of the plurality of disc elements forming a broken line that corresponds substantially to the profile to be machined, and each disc element having a diamond outer ring for cutting grooves in the brittle-fracturing material by abrasive action, each diamond outer ring having a thickness, an internal circumference, and an external circumference independent of the thicknesses, the internal circumferences, and the external circumferences respectively, of the diamond outer rings of adjacent disc elements;

fragmenting means provided in the spaces between the adjacent disc elements for mechanically fragmenting projections of the brittle-fracturing material extending into the spaces by impact and by brittle fracture.

2. The apparatus of claim 1, wherein the fragmenting means includes a plurality of projecting elements of hard tough material provided on the disc elements approximately on the internal circumference of the diamond outer rings and projecting, in the direction of the thickness of the disc elements, beyond the thickness of the diamond outer rings.

3. The apparatus of claim 2, wherein the projecting elements are angularly equidistant in the disc elements.

4. The apparatus of claim 2, wherein the side of the disc elements opposite from that with the projecting elements is provided with a generally star-shaped element for the expulsion of machining detritus.

5. The apparatus of claim 1, wherein the diamond outer rings are subdivided into a plurality of sectors at approximately equal intervals around the periphery of the disc elements and the fragmenting includes rotating planetary elements projecting beyond the internal circumference of the diamond outer rings, but not beyond the external circumference, arranged in the spaces.

6. The apparatus of claim 5, wherein the planetary elements are mounted so as to pivot eccentrically.

7. The apparatus of claim 5, wherein the rotating planetary elements have diamond-coated teeth.

8. The apparatus of claim 5, wherein the opposite side of the disc elements from that with the planetary elements is provided with a generally star-shaped element for the expulsion of machining detritus.

9. The apparatus of claim 1, wherein the diamond outer rings are subdivided into a plurality of approximately equidistant sectors and the fragmenting means includes adjustable blocks fastened with an antirotation pin to the disc elements.

10. The apparatus of claim 1, wherein the fragmenting means includes an eccentric disc having a periphery carrying wedge-shaped teeth, the wedge-shaped teeth extending to within the internal circumference of the diamond outer ring.

11. The apparatus of claim 1, wherein the fragmenting means includes a disc having a periphery carrying wedge-shaped teeth, this disc being integral with the disc element, the wedge-shaped teeth extending to within the internal circumference of the diamond outer ring.

12. The apparatus of claim 1, wherein the disc elements with diamond outer rings are stacked on top of each other and mutually coupled to the drive spindle.

13. The apparatus of claim 12, wherein the drive spindle is hollow and is provided with apertures corresponding to the disc elements for the introduction of a cooling/lubricating fluid.

14. The apparatus of claim 1, wherein individual disc elements are different diameters in order that points defined by the diamond outer ring constitute, in the direction of the drive spindle, a broken line corresponding substantially to a shaping that is to be produced on the machined material.

15. The apparatus of claim 1, wherein the diamond outer ring has a grain selected as a function of the diameter of the disc elements or of the parts of material that are to be machined by the disc elements.

16. An apparatus for mounting on a drive spindle and for machining a generally continuous profile in a material, the apparatus comprising:

a plurality of disc elements configured for assembling proximate to one another on the drive spindle wherein adjacent disc elements define spaces therebetween, each disc element having a thickness and an outer diameter, at least one of the disc elements having a diameter different from another one of the disc elements, the outer diameters of said plurality of disc elements forming a broken line that corresponds substantially to the profile; and fragmenting means provided in the spaces between the adjacent disc elements for mechanically fragmenting the material extending into the spaces.

17. The apparatus of claim 16, wherein each disc element has an abrasive-coated outer ring, each outer ring having a thickness, an internal circumference, and an external circumference independent of the thicknesses, the internal circumferences, and the external circumferences respectively, of the outer rings of adjacent disc elements.

18. The apparatus of claim 17, wherein the fragmenting means includes a plurality of projecting elements provided on the disc elements and projecting in the direction of the thickness of the disc elements, beyond the thickness of the outer rings.

19. The apparatus of claim 18, wherein the projecting elements are formed of a hard tough material and provided on the disc elements approximately on the internal circumference of the abrasive-coated outer rings.

20. The apparatus of claim 19, wherein the abrasive-coated outer rings are diamond-coated outer rings.

21. The apparatus of claim 18, wherein the projecting elements are angularly equidistant in the disc elements.

22. The apparatus of claim 18, wherein the abrasive-coated outer rings are subdivided into a plurality of sectors at approximately equal intervals around the periphery of the disc elements and the fragmenting means includes rotating planetary elements arranged in the spaces and projecting beyond the internal circumference of the abrasive-coated outer rings, but not beyond the external circumference.

23. The apparatus of claim 22, wherein the planetary elements are mounted so as to pivot eccentrically.

24. The apparatus of claim 22, wherein the planetary elements have abrasive-coated teeth.

25. The apparatus of claim 24, wherein the teeth of the planetary elements are diamond coated.

* * * * *